United States Patent Office 3,271,469
Patented Sept. 6, 1966

3,271,469
PREPARATION OF ALKENYL SUBSTITUTED
AROMATIC HYDROCARBONS
Herman S. Bloch, Skokie, Ill., assignor to Universal Oil
Products Company, Des Plaines, Ill., a corporation of
Delaware
No Drawing. Filed Sept. 30, 1963, Ser. No. 312,363
13 Claims. (Cl. 260—669)

This invention relates to a novel method of preparing an alkenyl substituted aromatic hydrocarbon from a corresponding alkyl substituted aromatic hydrocarbon. More particularly, this invention relates to a novel method of preparing an alkenylbenzene from an alkylbenzene, for example, styrene from ethylbenzene, alpha-methylstyrene from cumene, divinylbenzene from diethylbenzene, etc.

The conversion of alkyl substituted aromatic hydrocarbons to alkinyl substituted aromatic hydrocarbons is accomplished principally by thermal or catalytic dehydrogenation. Other methods, including the use of hydrogen acceptors, have not been suitable for commercial application. The thermal or catalytic dehydrogenation of alkyl substituted aromatic hydrocarbons like ethylbenzene, diethylbenzene, cumene, etc., to form the corresponding alkenyl substituted aromatic hydrocarbons, involves a highly endothermic reaction requiring temperatures in excess of about 600° C. even with use of a catalyst. The high temperatures which favor dehydrogenation also favor the formation of degradation by-products. It therefore becomes necessary to effect the dehydrogenation at a temperature somewhat less than that most favorable to dehydrogenation to the extent that formation of degradation by-products is maintained at a minimum commensurate with the formation of the desired dehydrogenation products at a commercially acceptable rate. In addition, it is necessary that the material being treated be exposed to reaction temperatures for only a limited period —usually a period of less than about one second per pass.

It is an object of this invention to effect the dehydrogenation of alkyl substituted aromatic hydrocarbons at a commercially acceptable rate and at a comparatively moderate temperature to minimize the formation of degradation products.

In one of its broad aspects, the present invention embodies a method of preparing an alkenyl substituted aromatic hydrocarbon which comprises heating an alkyl substituted aromatic hydrocarbon at a temperature of from about 200° C. to about 400° C. in contact with a tetrahalide of carbon containing at least one halogen atom independently selected from the group consisting of bromine, chlorine, and iodine, the remaining halogen atoms thereof being of a lower atomic number.

Another embodiment of this invention relates to a method of preparing an alkenylbenzene which comprises heating an alkylbenzene at a temperature of from about 200° C. to about 400° C. in contact with a tetrahalide of carbon containing at least one halogen atom independently selected from the group consisting of bromine, chlorine and iodine, the remaining halogen atoms thereof being of a lower atomic number.

A more specific embodiment of this invention is in a method of preparing an alkenylbenzene which comprises heating an alkylbenzene at a temperature of from about 200° C. to about 400° C. in contact with a tetrahalide of carbon containing from one to three bromine atoms, the remaining halogen atoms thereof being of a lower atomic number.

A still more specific embodiment relates to a method of preparing styrene, which method comprises heating ethylbenzene at a temperature of from about 200° C. to about 400° C. in contact with trichlorobromomethane.

Still another of the more specific embodiments of this invention relates to a method of preparing divinylbenzene which comprises heating diethylbenzene at a temperature of from about 200° C. to about 400° C. in contact with trichlorobromomethane.

Other objects and embodiments of this invention will become apparent in the following detailed specification.

Alkyl substituted aromatic hydrocarbons which are convertible to alkenyl substituted aromatic hydrocarbons in accordance with the method of this invention may comprise a benzene nucleus or condensed benzene nuclei. The alkyl group or groups substituted thereon may contain up to about 20 or more carbon atoms and should further contain at least one hydrogen atom attached to each of two adjacent carbon atoms. At the reaction conditions herein described, the alkyl substituent is converted principally to the corresponding monoolefinic alkenyl substituent of the same carbon configuration. Thus, in a preferred embodiment of this invention, ethylbenzene is converted to styrene, and in another preferred embodiment diethybenzene is converted to divinylbenzene, and in still another preferred embodiment cumene is converted to alpha-methylstyrene. Other alkyl substituted aromatic hydrocarbons which can be treated in accordance with the method of this invention include alkylbenzenes like 1,3-diethyl-5-methylbenzene, 1,2,4-triethylbenzene, 1,3,5-triethylbenzene, 1-ethyl-4-methylbenzene, n-propylbenzene, isopropylbenzene, p-cymene, p-ethylisopropylbenzene, n-butylbenzene, sec-butylbenzene, n-amylbenzene, iso-amylbenzene, cyclopentylbenzene, cyclohexylbenzene, etc., as well as alkyl substituted polynuclear hydrocarbons, for example, 1-ethylnaphthalene, 9-ethylanthracene, 1-ethylphenanthrene, 7-isopropyl-1-methylphenanthrene, and the like.

Dehydrogenation as herein contemplated is by indirect methods and involves a hydrogen-halogen exchange reaction immediately preceding a dehydrohalogenation reaction. Hydrogen-halogen exchange occurs between a tetrahalide of carbon, hereinafter described, and an alkyl substituent of the selected alkyl substituted aromatic hydrocarbon treated in accordance with the method of this invention. The resulting halide derivative is unstable at reaction conditions herein employed and is substantially immediately dehydrohalogenated to form the desired alkenyl substituted aromatic hydrocarbon and a hydrogen halide.

The aforesaid tetrahalide of carbon is a mixed halide of carbon containing at least one halogen atom independently selected from the group consisting of chlorine, bromine, and iodine, the remaining halogen atoms thereof being of a lower atomic number than the selected halogen atom. It has been found that the presence in a tetrahalide of carbon of halogen atoms of lower atomic number (i.e. those of strongly electron-withdrawing character) facilitates the formation of a radical of a halogen atom of higher atomic number present in the same molecule. The practical result is that alkyl substituted aromatic hydrocarbons can be converted to alkenyl substituted aromatic hydrocarbons at a comparatively moderate temperature less conducive to the formation of degradation products, and within a limited contact period as presently practiced. Suitable carbon tetrahalides include bromotrichloromethane, dibromodichloromethane, chlorotribromomethane, bromotrifluoromethane, dibromodifluoromethane, fluorotribromomethane, chlorotrifluoromethane, dichlorodifluoromethane, fluorotrichloromethane, iodotrichloromethane, diiododichloromethane, chlorotriiodomethane, iodotrifluoromethane, diiododifluoromethane, fluorotriiodomethane, etc. Those carbon tetrahalides containing from one to three bromine atoms, the remaining halogen atoms being of a lower atomic number, are preferred, particularly bromotrichloromethane and bromotrifluoromethane.

Reaction conditions herein employed relate principally to temperature and contact time of the reactants. Conversion of the alkyl substituted aromatic hydrocarbon to an alkenyl substituted aromatic hydrocarbon can be effected in the liquid phase as well as in the vapor phase. However, a vapor phase operation is preferred and the pressure employed is chosen accordingly. Thus, in some cases the pressure may be simply atmospheric pressure, or autogenous pressure developed during the course of the reaction, or inert volatile diluents such as nitrogen may be used to facilitate vaporization of the reactants.

In accordance with the method of this invention, the selected alkyl substituted aromatic hydrocarbon is heated in contact with the tetrahalide of carbon at a temperature of from about 200° C. to about 400° C. The reactants are maintained in contact at the said temperature conditions for a period of from about 1 to about 5 seconds. The optimum contact time is in part dependent on the particular temperature utilized and in part on the polymerization characteristics of the desired products.

The method of this invention is carried out in a continuous manner. For example, the starting materials comprising an alkyl substituted aromatic hydrocarbon and a tetrahalide of carbon are charged continuously through a suitable reactor maintained at the prescribed temperature and at the desired pressure. An unpacked vessel or coil equipped with adequate heating means can be utilized as a reactor. The reactants can be charged in equimolar amounts, or the hydrocarbon can be charged in a molar excess of up to about 20 to 1. The reactants can be combined in the selected ratio and charged through the reactor in a single stream. However, a preferred method comprises preheating the reactants and charging the same to the reactor in separate streams. The reactor effluent is withdrawn from the reactor at a rate which will insure adequate residence time therein and immediately quenched to obviate polymerization of the desired product. Hydrogen halide, resulting from the dehydrohalogenation reaction, is flashed from the cooled or partly cooled reactor effluent and may be re-oxidized to form elemental halogen and water. The residual reactor effluent is subjected to fractional distillation in the presence of a suitable polymerization inhibitor, such as a solution of 0.1% t-butylcatechol in benzene. The haloform resulting from the hydrogen-halogen exchange reaction is taken overhead and treated with the aforesaid elemental halogen to reform the carbon tetrahalide starting material. For example, a bromotrichloromethane starting material is reformed by treating chloroform with bromine at a temperature of from about 125° C. to about 200° C., or at a lower temperature in contact with a catalyst such as aluminum bromide, zinc bromide, calcium bromide, iron bromide, etc. The desired alkenyl substituted aromatic hydrocarbon is separated as a fraction of said distillation and unreacted starting materials are recycled to form a portion of the reactor feed.

The following examples are presented in further illustration of the method of this invention. It is not intended that said examples shall serve as an undue limitation on the generally broad scope of this invention as set out in the appended claims.

Example I

In a once-through operation, ethylbenzene and bromotrichloromethane are preheated to about 225° C. and charged to a vertical tubular reactor in separate streams and in a ratio of about 4 mols of ethylbenzene per mol of bromotrichloromethane. The reactor is maintained at about 225° C. and at substantially atmospheric pressure. The reactants are passed through the reactor at a rate such as to give a contact time of from about 1 to about 5 seconds. The reactor effluent is passed through a water-cooled condenser and hydrogen bromide separated as non-condensable gas. The condensate is neutralized with dilute alkali and fractionally distilled. A solution of 0.1% butylcatechol in ethylbenzene is added to the neutralized condensate to inhibit polymerization. In this once-through operation conversion of ethylbenzene to styrene is about 18%.

Example II

In the preparation of divinylbenzene, 1,4-diethylbenzene and bromotrifluoromethane are preheated to about 225° C. and charged to a vertical tubular reactor in separate streams and in a ratio of about 2 mols of diethylbenzene per mol of bromotrifluoromethane. The reactor is maintained at about 225° C. and at substantially atmospheric pressure. Reactants are passed through the reactor at a rate such as to give a contact time of from about 1 to about 5 seconds. The reactor effluent is passed through a water-cooled condenser and hydrogen bromide separated as a non-condensable gas. The condensate is neutralized with dilute alkali and fractionally distilled under vacuum. A solution of 0.1% butylcatechol in diethylbenzene is added to the neutralized condensate to inhibit polymerization. In this once-through operation conversion of diethylbenzene to divinylbenzene is about 5%; ethylstyrene separately recovered (formed to the extent of about 13%) is recycled for further conversion.

I claim as my invention:

1. A method of preparing an alkenyl substituted aromatic hydrocarbon which comprises heating an alkyl substituted aromatic hydrocarbon at a temperature of from about 200° C. to about 400° C. in contact with a tetrahalide of carbon containing at least one halogen atom independently selected from the group consisting of bromine, chlorine, and iodine, the remaining halogen atoms thereof being of a lower atomic number.

2. A method of preparing an alkenyl substituted benzene which comprises heating an alkyl substituted benzene at a temperature of from about 200° C. to about 400° C. in contact with a tetrahalide of carbon containing at least one halogen atom independently selected from the group consisting of bromine, chlorine, and iodine, the remaining halogen atoms thereof being of a lower atomic number.

3. A method of preparing an alkenyl substituted aromatic hydrocarbon which comprises heating an alkyl substituted aromatic hydrocarbon at a temperature of from about 200° C. to about 400° C. in contact with a tetrahalide of carbon containing from one to three bromine atoms, the remaining halogen atoms thereof being of a lower atomic number.

4. A method of preparing an alkenyl substituted aromatic hydrocarbon which comprises heating an alkyl substituted aromatic hydrocarbon at a temperature of from about 200° C. to about 400° C. in contact with a tetrahalide of carbon containing from one to three chlorine atoms, the remaining halogen atoms thereof being of a lower atomic number.

5. A method of preparing an alkenyl substituted aromatic hydrocarbon which comprises heating an alkyl substituted aromatic hydrocarbon at a temperature of from about 200° C. to about 400° C. in contact with a tetrahalide of carbon containing from one to three iodine atoms, the remaining halogen atoms thereof being of a lower atomic number.

6. A method of preparing an alkenylbenzene which comprises heating an alkylbenzene at a temperature of from about 200° C. to about 400° C. in contact with a tetrahalide of carbon containing from one to three bromine atoms, the remaining halogen atoms thereof being of a lower atomic number.

7. A method of preparing an alkenylbenzene which comprises heating an alkylbenzene at a temperature of from about 200° C. to about 400° C. in contact with a tetrahalide of carbon containing from one to three chlorine atoms, the remaining halogen atoms thereof being of a lower atomic number.

8. A method of preparing an alkenylbenzene which comprises heating an alkylbenzene at a temperature of from about 200° C. to about 400° C. in contact with a tetrahalide of carbon containing from one to three iodine atoms, the remaining halogen atoms thereof being of a lower atomic number.

9. A method of preparing styrene which comprises heating ethylbenzene at a temperature of from about 200° C. to about 400° C. in contact with trifluorobromomethane.

10. A method of preparing divinylbenzene which comprises heating diethylbenzene at a temperature of from about 200° C. to about 400° C. in contact with trifluorobromomethane.

11. A method of preparing alpha-methyl styrene which comprises heating cumene at a temperature of from about 200° C. to about 400° C. in contact with trifluorobromomethane.

12. A method of preparing styrene which comprises heating ethylbenzene at a temperature of from about 200° C. to about 400° C. in contact with trichlorobromomethane.

13. A method of preparing divinylbenzene which comprises heating diethylbenzene at a temperature of from about 200° C. to about 400° C. in contact with trichlorobromomethane.

References Cited by the Examiner

UNITED STATES PATENTS

| | | | |
|---|---|---|---|
| 1,938,827 | 12/1933 | Gibbons et al. | 260—669 |
| 2,370,513 | 2/1945 | Amos et al. | 260—680 |
| 3,207,806 | 9/1965 | Bajars | 260—680 |

DELBERT E. GANTZ, *Primary Examiner.*

C. R. DAVIS, *Assistant Examiner.*